US010552765B1

(12) United States Patent
Ting

(10) Patent No.: US 10,552,765 B1
(45) Date of Patent: Feb. 4, 2020

(54) PREDICTIVE TERMINAL MANAGEMENT

(71) Applicant: NCR Corporation, Atlanta, GA (US)

(72) Inventor: Orson Ting, Lahug (PH)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/286,730

(22) Filed: Feb. 27, 2019

(51) Int. Cl.
*G08B 21/00* (2006.01)
*G06N 20/00* (2019.01)
*G06F 13/42* (2006.01)
*G08B 21/18* (2006.01)
*G01P 15/18* (2013.01)

(52) U.S. Cl.
CPC .............. *G06N 20/00* (2019.01); *G01P 15/18* (2013.01); *G06F 13/4282* (2013.01); *G08B 21/18* (2013.01); *G06F 2213/0042* (2013.01)

(58) Field of Classification Search
CPC ..... G06N 20/00; G01P 15/18; G06F 13/4282; G06F 2213/0042; G08B 21/18
See application file for complete search history.

(56) References Cited

U.S. PATENT DOCUMENTS

| | | | |
|---|---|---|---|
| 6,336,065 B1* | 1/2002 | Gibson | B61C 17/04 340/438 |
| 10,182,328 B1* | 1/2019 | Maibach | H04W 52/0225 |
| 2008/0255772 A1* | 10/2008 | Sjostrand | B25J 9/1674 702/34 |
| 2010/0258621 A1* | 10/2010 | Schlabach | G06Q 10/06 235/379 |
| 2011/0121969 A1* | 5/2011 | Mercer | A61B 6/581 340/540 |
| 2017/0188443 A1* | 6/2017 | Nakahara | H05G 1/26 |
| 2018/0211454 A1* | 7/2018 | Carlson | B60W 50/0205 |
| 2019/0265657 A1* | 8/2019 | Inagaki | G05B 15/02 |

* cited by examiner

*Primary Examiner* — Munear T Akki
(74) *Attorney, Agent, or Firm* — Schwegman, Lundberg & Woessner

(57) ABSTRACT

A 3-axis recording movements/acceleration and/or temperature/humidity is integrated into a motherboard of a terminal. Movements and acceleration and/or temperature/humidity experienced by the terminal are captured and logged and reported from the terminal to a predictive management service. The predictive management service correlates the movements and acceleration and/or temperature/humidity with service records to identify patterns. During operation of the terminal, the predictive management service provides predicted service actions needed by the terminal in advance of a problem being experienced by the terminal based on the patterns, and the predictive management service notifies a service management system for performing the service actions.

20 Claims, 4 Drawing Sheets

PREDICTIVE TERMINAL MANAGEMENT

BACKGROUND

Most computing devices are somewhat rigid in that they are capable of sustaining a decent amount of unintentional damage. However, computing devices are electromechanical and failures do happen and are in fact eventually inevitable at some point in time.

Most predictive failure techniques in the industry are directed to the software processing environment, memory, hard drive, and the processor. A variety of programmatic approaches are available to track and raise alerts when conditions indicate a failure has happened or is about to happen.

Additionally, computing devices often have peripheral devices, which can be vital to the overall intended purpose of the computing devices. For instance, A Point-Of-Sale (POS) terminal may include a variety of devices integrated into the main computing core or interfaced to the main computing core. For a POS terminal to be fully operational to service customer checkouts, a scanner, touchscreen, and a printer need to be functioning properly. Even a simple touchscreen hinge that malfunctions can cause the touchscreen to be inoperable or the display head to become wobbly or loose.

Existing software monitoring and tracking has no ability to detect when a mechanical hinge is going bad. Once the touchscreen is inoperable, the entire POS terminal is inoperable because transaction information will not display and transaction inputs cannot be displayed and received by the POS core. As another example, the touchscreen surface may crack or degrade such that certain areas on the touchscreen are unable to receive touch inputs. Still further, when a printer fails to properly print receipts there may be no advance notice or information as to why the printer is malfunctioning through software only based approaches.

SUMMARY

In various embodiments, methods and a system for predictive terminal malfunction and predictive terminal management are presented.

According to an embodiment, a method for predictive terminal malfunction is presented. Specifically, and in one embodiment, sensor event data is obtained from a sensor integrated into a motherboard of a terminal. The sensor event data is correlated with transaction data being produced on the terminal as sensor-transaction data. The sensor-transaction data is provided to a predictive management service to proactively predict a service action on the terminal in advance of a terminal problem being experienced by the terminal.

In an embodiment, the sensor in integrated into a separate board from the motherboard and connected to the motherboard via a Universal Serial Bus (USB) connection.

DETAILED DESCRIPTION

Figure 1:
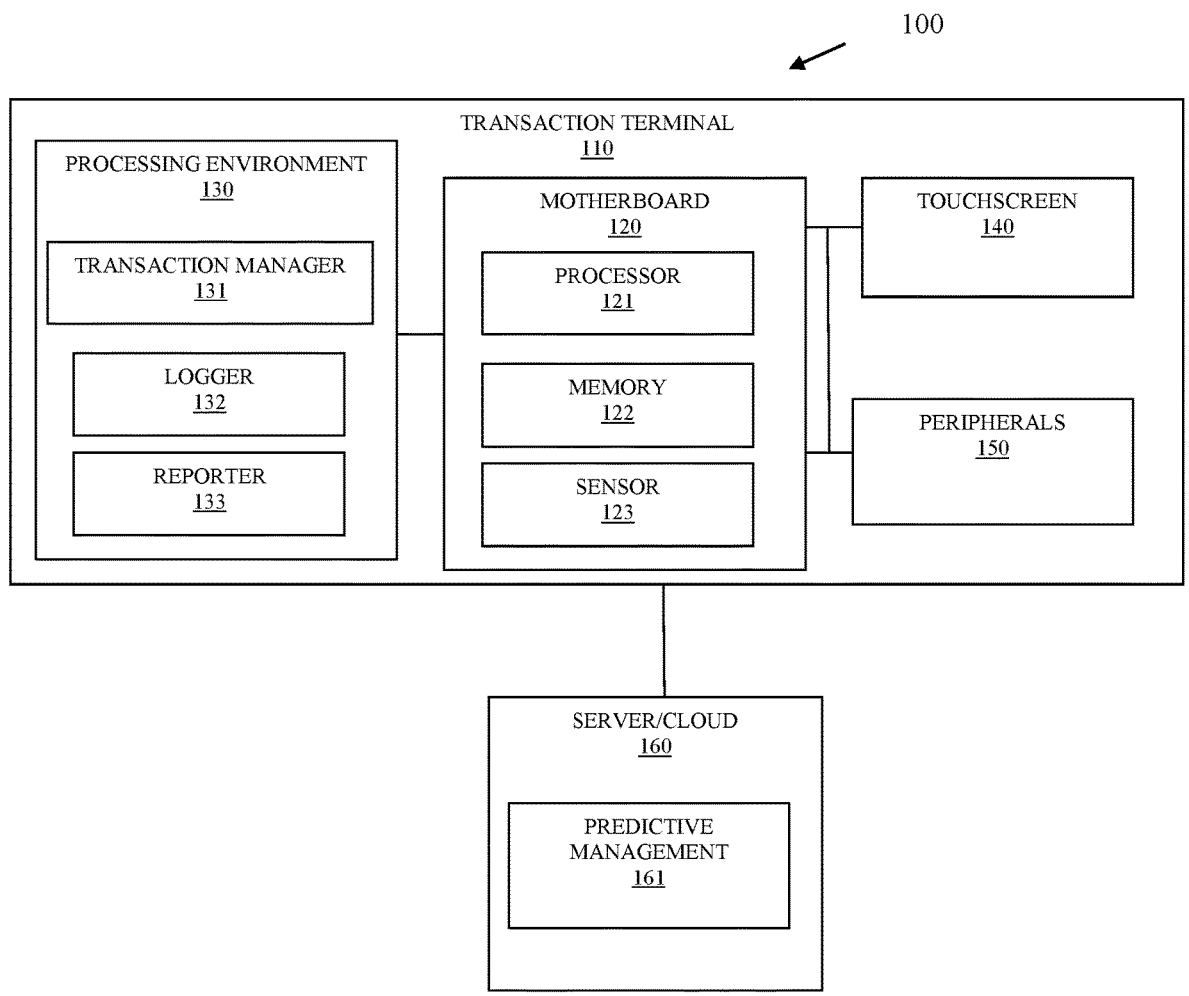
FIG. 1 is a diagram of a system for predictive terminal malfunction and terminal management, according to an example embodiment.

FIG. 1 is a diagram of a system 100 for predictive terminal malfunction and terminal management, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of predictive terminal malfunction and terminal management presented herein and below.

As will be more completely discussed herein and below, the teachings provide for capturing movement/acceleration and temperature/humidity measurements captured from a sensor embedded in a motherboard of a terminal. The sensor data is correlated with transaction data for a transaction that is being processed on the terminal and provided to a predictive management system/service. The predictive management system/service correlates the sensor-transaction data with service data associated with service records for the terminal and identifies potential problems that the terminal has not yet experienced but can be expected to experience. The impending problem is reported to a service management system/service for scheduling service or parts needed by the terminal before the problem is experienced.

The system 100 includes a transaction terminal 110. The transaction terminal 110 includes: a motherboard 120 having a processor 121, memory 122, and electromechanical sensor 123. The terminal 110 further includes a processing environment 130 having a transaction manager 131, a logger 132, and a reporter 133. Further, the transaction terminal 110 includes a touchscreen display 140 and a variety of other interfaced peripherals 150. The system 100 further includes a server/cloud 160 having a predictive management service 161.

The transaction terminal 110 also includes non-transitory computer-readable storage media having executable instructions representing the transaction manager 131, the logger 132, and the reporter 133. The processor 121 acquires the executable instructions from the non-transitory computer-readable storage media and loads them into memory 122 and executes the executable instructions which causes the processor to perform the processing associated with the transaction manager 131, the logger 132, and the reporter 133.

The novel sensor 123 is a 3-axis sensor designed to measure movements/acceleration made to the motherboard 120 integrated into the terminal 110. The sensor 123 can also include a temperature/humidity sensor. So, when the touchscreen 140 is tilted the angle of tilt, the force, and movement are produced by the sensor 123 and the data associated with the measurements are captured as events raised by sensor 123 and detected by the logger 132. The same is true to capture temperature and humidity of the terminal 110 at predefined or configured intervals of time or when a given temperature/humidity reading exceeds a predefined threshold. The logger 132 also has access to transaction data being produced for a transaction by the transaction manager 131, such as time of day, calendar day, transaction terminal identifier, transaction terminal operator identifier, transaction identifier, etc. The logger 132 records the sensor event data and the corresponding transaction data in storage.

The reporter 133 detects when the storage having the sensor event data and corresponding transaction data is modified by monitoring the storage. The reporter 133 may be configured with threshold values for the sensor data, such that upon detecting a sensor value that meets or exceed the threshold value, the reporter sends the sensor event data and the corresponding transaction data to the predictive management service 161 over an accessible network connection between the terminal 110 and the server/cloud 160. The reporter 133 may also be configured to send accumulated sensor event data and its corresponding transaction data at predefined intervals of time, when a predefined amount of data has been accumulated since a last report made by the reporter 133, and/or when the predictive management service 161 dynamically requests the sensor event data.

The sensor 123 also captures touches made on the touchscreen 140 and the recorded force for each such touch as part of the sensor event data. For instance, if a cashier (operator) is abusively hitting or touching the touchscreen 140 with excessive force during touches. The total number of touches for all operators on the touchscreen 140. Furthermore, if the terminal 110 is mounted on a shaky structure (countertop), such movements are captured in the event data, such data may indicated why a printer (type of peripheral 150) is performing poorly or printing smudged receipts. In an embodiment, the sensor 123 is on an independent board from the motherboard 120 and connects to the motherboard 120 via a USB connection.

The sensor 123 provides event data for a variety of mechanical and environmental factors that are not available today through conventional software-only based tracking, such as hinge use (for tilt of touchscreen 140), total number of touches made to the touchscreen 120, force of each such touch made to the touchscreen 140, vibrations relevant to the structures upon which the terminal 110 is mounted or placed, sudden significant movements relevant to the terminal 110 being dropped, temperature/humidity readings, and the like.

The logger 132 correlates the sensor event data with the transaction data produced by the transaction manager 131 in storage, and the reporter 133 reports the correlated data based on one or more of: threshold event data, periodically based on predefined intervals of time, periodically based on a particular amount of accumulated event data, and/or dynamically based on a specific request from the predictive management service 161.

The predictive management service 161 can collect the sensor event data from a plurality of transaction terminals 110 located at a single site or located across multiple sites. Service data for the terminals 110 are used to correlate the event data with service records, such as by analyzing the event sensor data available for a specific type of service record or service data and discovering patterns between the type of service record and event sensor data.

In an embodiment, the predictive management service 161 includes a machine learning algorithm that is trained with input as the sensor event data and a given service record. This allows the machine learning algorithm to develop weights and factors associated with sensor event data for purposes of predicting a given type of service before such service event data is generated. Once trained with an acceptable level of accuracy, the machine learning algorithm is fed real-time sensor event data and produces expected service record or service action.

Using either a pattern-based correlation approach or a machine-learning algorithm approach, the predictive management service 161 proactively predicts a service need for the terminal 110 based on an expected service record. The predictive service record can be sent in real time to a service management system for scheduling service or preventive service on the terminal 110. This ensures that the terminal 110 can be scheduled to be offline for any needed service actions and does not unexpectedly and abruptly fail during transaction processing by the transaction manager 131.

The collected sensor data permits site deployments for transaction terminals 110 to be correlated with service records for purposes of discovering valuable patterns and correlations between the life cycle management and service actions of individual terminals 110 or entire terminal deployment sites having multiple terminals 110.

For example, consider a touchscreen 140 that has been tilted back and forth by operators N number of times, patterns and correlations identified by the predictive management service 161 identify that N number of times is approaching a given known service threshold. The predictive management service 161 then notifies a service management system that a given component of the terminal 110 needs ordered, and the service management system proactively orders the component and schedules the replacement before the given component fails.

As another example, if the sensor data indicates the terminal 110 was dropped with a measured force, the predictive management service 161 may notify a service management system that the terminal 110 requires service and provide a warning message back to the reporter 133. The reporter 133 can cause the touchscreen 140 to display a warning message that the terminal 110 may fail soon even though it appears to be operational as a result of the dropping.

In an embodiment, the motherboard 120 includes more than 1 type of sensor 123 or multiple integrated sensors 123 of a same type.

In an embodiment, the peripherals 150 include an integrated sensor 123 and the logger 132 captures the additional event data and correlates with the sensor event data of the motherboard from sensor 123 with the peripheral sensor event data and the transaction data produced by the transaction manager 131 in storage. The reporter 133 provides the correlated data to the predictive management service 161 and correlates with service event data for both the terminal 110 and the peripherals 150.

In an embodiment, one or more additional sensors 123 are placed in component pieces of the terminal 110, such as on a hinge point or mechanical component location.

The predictive management service 161 may also provide a user-facing interface for obtaining sensor event data and user-defined levels of detail, such as on a per-terminal basis, per-operator basis, per-site having multiple terminals 110. The interface allows the user to zoom in for more specific sensor event data or zoom out for more coarse-grain level of sensor event data.

In an embodiment, the transaction terminal 110 is one of: a POS terminal, a Self-Service Terminal (SST), an Automated Teller Machine (ATM), and/or a kiosk.

In an embodiment, the transaction terminal 110 is a tablet or laptop computer.

In an embodiment, the sensor 123 includes a temperature/humidity sensor.

These and other embodiments will now be discussed with reference to the FIGS. 2-4.

Figure 2:
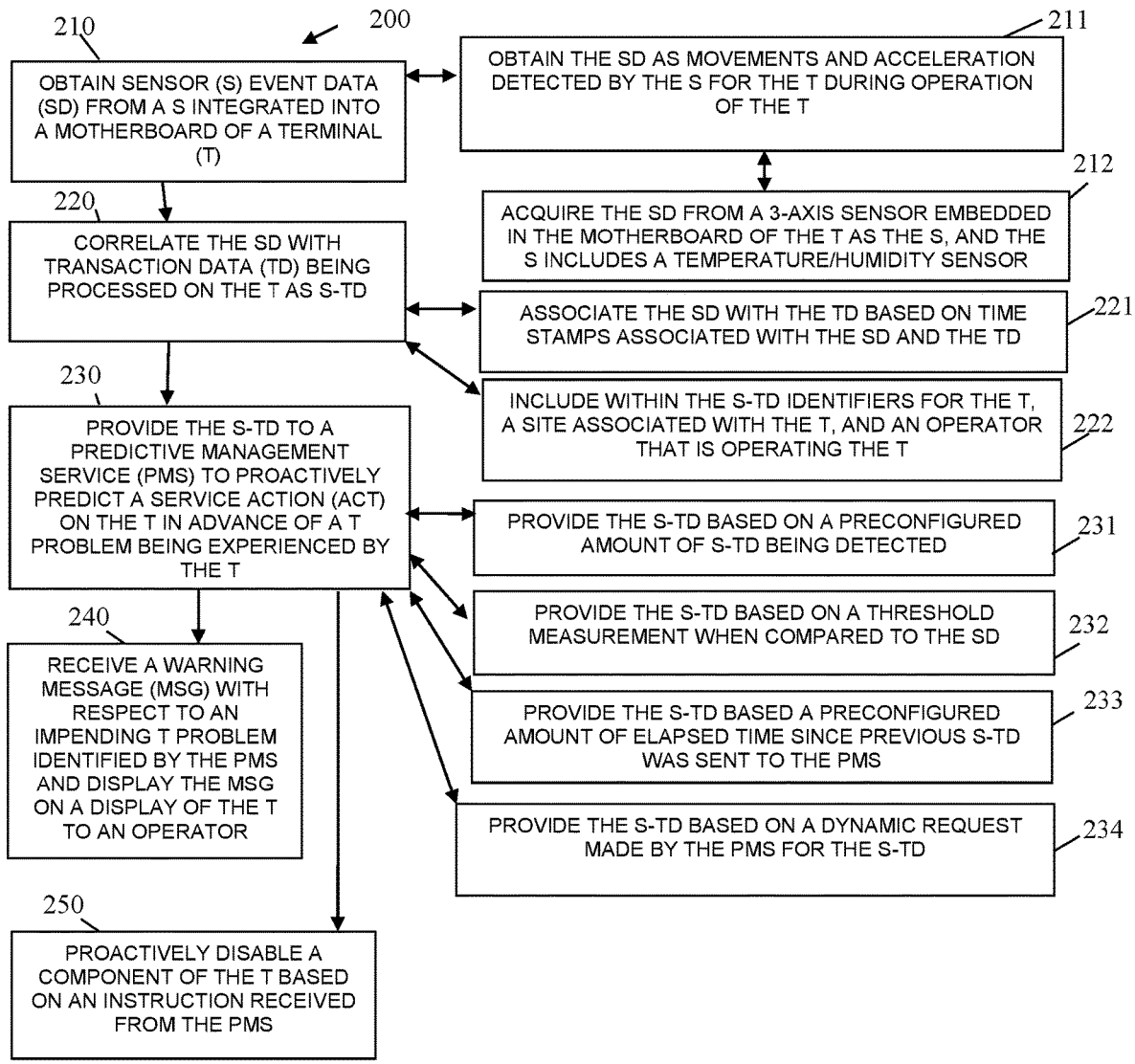
FIG. 2 is a diagram of a method for predictive terminal malfunction and terminal management, according to an example embodiment.

FIG. 2 is a diagram of a method 200 for predictive terminal malfunction and terminal management, according to an example embodiment. The software module(s) that implements the method 200 is referred to as a "terminal sensor agent." The terminal sensor agent is implemented as executable instructions programmed and residing within memory and/or a non-transitory computer-readable (processor-readable) storage medium and executed by one or more processors of a device. The processor(s) of the device that executes the terminal sensor agent are specifically configured and programmed to process the terminal sensor agent. The terminal sensor agent may have access to one or more network connections during its processing. The network connections can be wired, wireless, or a combination of wired and wireless.

In an embodiment, the device that executes the terminal sensor agent is the terminal 110. In an embodiment, the terminal 110 is one of: a POS terminal, a SST, an ATM, a kiosk, a tablet computer, and/or a laptop computer.

In an embodiment, the terminal sensor agent some or all of: the sensor 123, the logger 132, and the reporter 133.

The device that executes the terminal sensor agent includes a 3-axis sensor that is integrated into the motherboard of the device. In an embodiment, the terminal sensor includes a movement/acceleration and temperature/humidity sensors.

At 210, the terminal sensor agent obtains sensor event data from a sensor that is integrated into a motherboard of the terminal.

In an embodiment, at 211, the terminal sensor agent obtains the sensor data as movements and acceleration measurements detected by the sensor for the terminal during operation of the terminal. This can include tilting the touchscreen, vibrations associated with the terminal being placed on an uneven operating surface environment, physical movement of the terminal, dropping the terminal, etc.

In an embodiment of 211 and at 212, the terminal sensor agent acquires the sensor data from a 3-axis sensor embedded in the motherboard of the terminal as the sensor; the 3-axis sensor including a temperature/humidity sensor.

At 220, the terminal sensor agent correlates the sensor data with transaction data being produced in real time by the terminal for a transaction being processed on the terminal as sensor-transaction data.

In an embodiment, at 221, the terminal sensor agent associated the sensor data with the transaction data based on time stamps associated with the sensor data and the transaction data.

In an embodiment, at 222, the terminal sensor agent includes within the sensor-transaction data identifiers for: the terminal, a site associated with the terminal, and operator that is operating the transaction terminal.

At 230, the terminal sensor provides the sensor-transaction data to a predictive management service to proactively predict a service action on the terminal in advance of a terminal problem being experienced by the terminal.

In an embodiment, at 231, the terminal sensor provides the sensor-transaction data based on a preconfigured amount of sensor-transaction data being detected since a last batch of previous sensor-transaction data was reported to the predictive management service.

In an embodiment, at 232, the terminal sensor provides the sensor-transaction data based on a threshold measurement when compared to the sensor-data. For instance, the sensor data may report an acceleration measurement and a force measurement that exceed as predefined threshold measurement and indicates that the sensor data should be reported because the sensor data indicates the terminal may have been dropped and hit the floor.

In an embodiment, at 233, the terminal sensor provides the sensor-transaction data based on a preconfigured amount of elapsed time since a previous sensor-transaction data was sent to the predictive management service. That is, at preconfigured intervals of time, the sensor-transaction data is sent by the terminal sensor to the predictive management service.

In an embodiment, at 234, the terminal sensor provides the sensor-transaction data based on a dynamic request made by the predictive management service for the sensor-transaction data.

In this manner, the terminal sensor can dynamically push the sensor-transaction data or allow dynamic pulls by the predictive management service for providing the sensor-transaction data.

According to an embodiment, at 240, the terminal sensor receives a warning message with respect to a predicted or impending problem identified by the predictive management service. Responsive to receiving the warning message, the terminal sensor displays the warning message on a display of the terminal to an operator of the terminal.

In an embodiment, at 250, the terminal sensor proactively disables a component of the transaction terminal based on an instruction received from the predictive management service. For example, the instruction may indicate that the touchscreen is no longer properly functioning and the terminal should switch to an interfaced keyboard for providing input. It may be that the touchscreen is functioning but based on predictions from the predictive management service, will soon stop functioning or will soon be producing inconsistent results.

Figure 3:
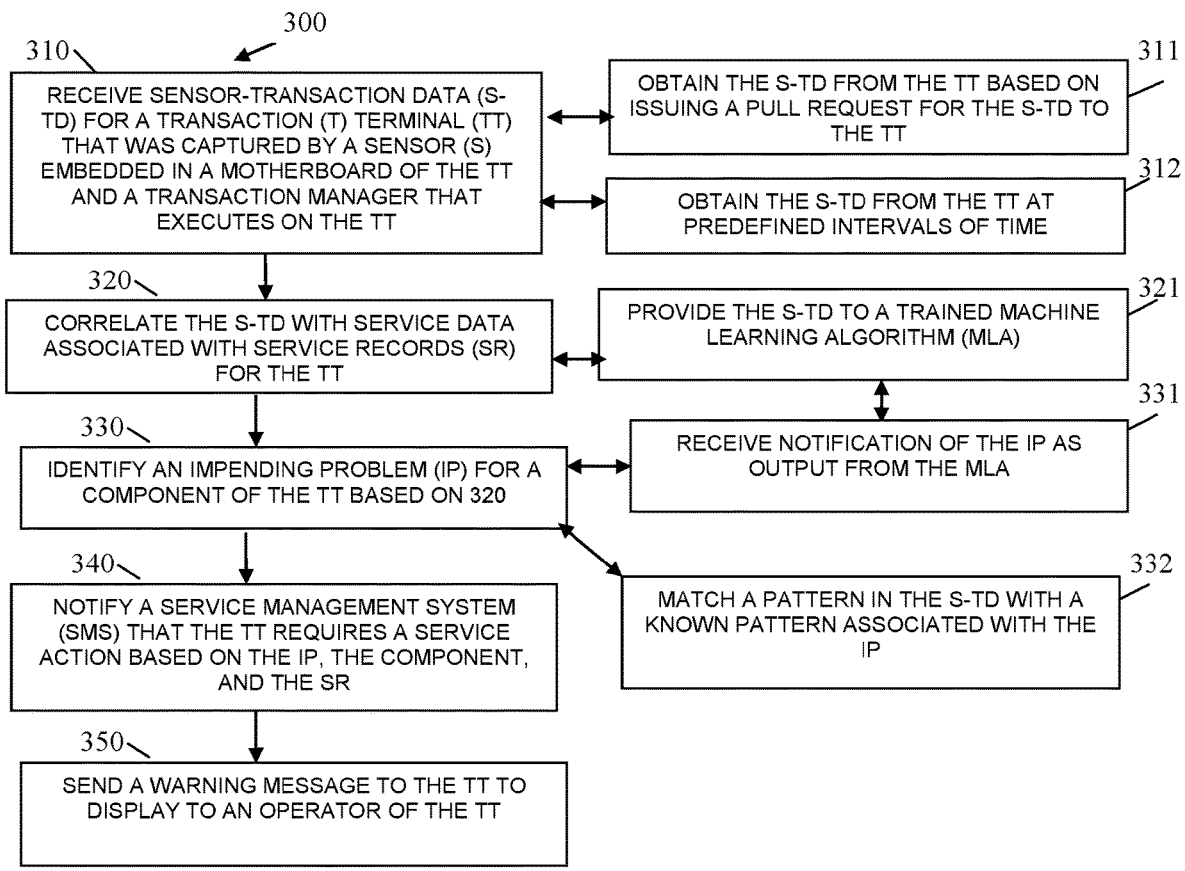
FIG. 3 is a diagram of another method for predictive terminal malfunction and terminal management, according to an example embodiment.

FIG. 3 is a diagram of another method 300 for predictive terminal malfunction and terminal management, according to an example embodiment. The software module(s) that implements the method 300 is referred to as a "service predictor." The service predictor is implemented as executable instructions programmed and residing within memory and/or a non-transitory computer-readable (processor-readable) storage medium and executed by one or more processors of a device. The processors that execute the service predictor are specifically configured and programmed to process the service predictor. The service predictor may have access to one or more network connections during its processing. The network connections can be wired, wireless, or a combination of wired and wireless.

In an embodiment, the device that executes the service predictor is the server/cloud 120.

In an embodiment, the service predictor is the predictive management service 161.

In an embodiment, the service predictor interacts with the reporter 133 and/or the method 200.

At 310, the service predictor receives sensor-transaction data for a transaction terminal that was captured by a sensor integrated or embedded in a motherboard of the transaction terminal and transaction data that executes a transaction on the transaction terminal.

In an embodiment, at 311, the service predictor obtains the sensor-transaction data from the transaction terminal based on issuing a dynamic pull request for the sensor-transaction data to the transaction terminal. Such a request can be dynamically sent to a transaction agent that responds with the sensor-transaction data. In an embodiment, the transaction agent is the logger 132 and/or the method 200.

In an embodiment, at 312, the service predictor obtains the sensor-transaction data from the transaction terminal at predefined intervals of time.

In an embodiment, the service predictor obtains the sensor-transaction data from the transaction terminal based on a predefined event being detected by a transaction agent that executes on the transaction terminal.

At 320, the service predictor correlates the sensor-transaction data with service data associated with service records for the transaction terminal.

In an embodiment, at 321, the service predictor provides the service-transaction data to a trained machine learning algorithm, such as the machine-learning algorithm discussed above with the FIG. 1.

At 330, the service predictor identifies an impending problem (a predicted problem) for a component of the transaction terminal based on 320.

In an embodiment of 321 and 330, at 331, the service predictor receives a notification of the impending problem (predicted problem) as output from the trained machine-learning algorithm.

In an embodiment, the component is: a hinge associated with tilting a touchscreen of the transaction terminal, the surface on which the transaction terminal or a peripheral printer is placed, a touchscreen surface that is wearing out from an excessive number of touches or touches with too great a force, and the like.

In an embodiment, at 332, the service predictor matches a pattern in the sensor-transaction data with a known pattern associated with the impending problem (predicted problem).

At 340, the service predictor notifies a service management system that the transaction terminal requires a service action based on the impending problem, the component, and the corresponding service records known to be associated with the impending problem.

In an embodiment, at 350, the service predictor sends a warning message to the transaction terminal to display to an operator of the transaction terminal. Such warning message can include, the touchscreen is wearing out or soon will wear out please use less force when touching the surface for providing input, the printer is experiencing excessive vibrations please relocate the printer to a more stable surface (countertop), the touchscreen is being tilted too frequently please avoid tilting the touchscreen display, and the like.

Figure 4:
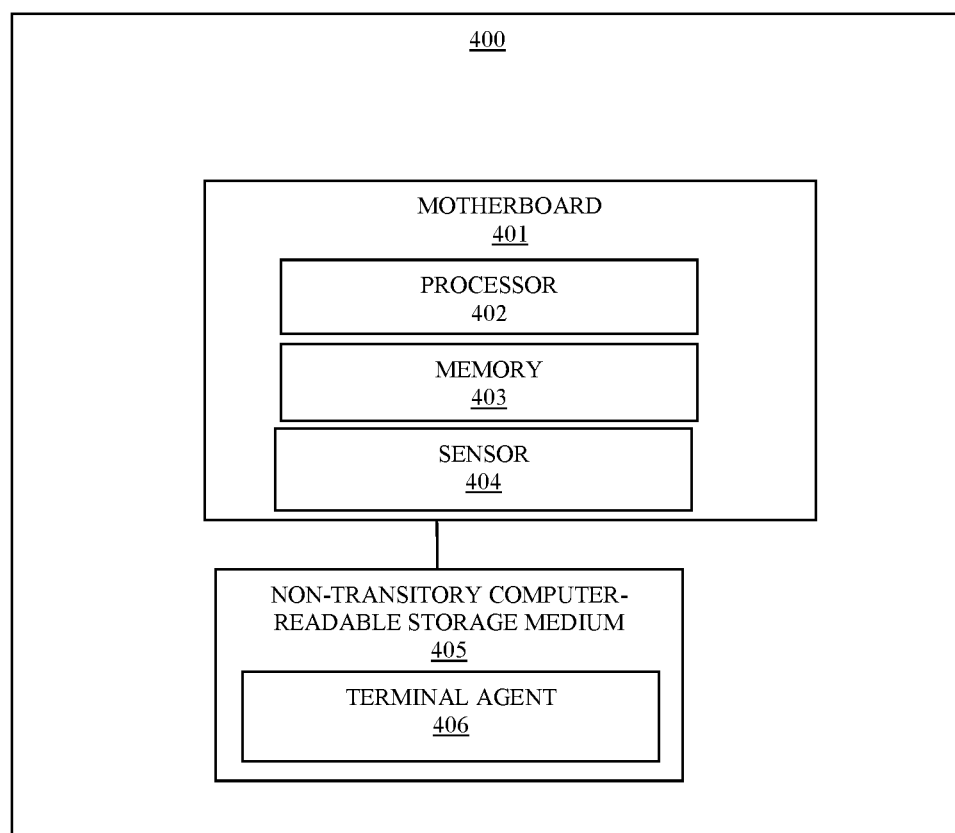
FIG. 4 is a diagram of terminal having predictive terminal malfunction and terminal management, according to an example embodiment.

FIG. 4 is a diagram of a terminal 400 for predictive terminal malfunction and terminal management, according to an example embodiment. The terminal 400 includes a variety of hardware components and software components. The software components of the terminal 400 are programmed and reside within memory and/or a non-transitory computer-readable medium and execute on one or more processors of the terminal 400. The terminal 400 may communicate over one or more networks, which can be wired, wireless, or a combination of wired and wireless.

In an embodiment, the terminal 400 implements, inter alia, the processing described above with respect to all of or some combination of: the sensor 123, the logger 132, the reporter 133, and/or the method 200.

In an embodiment, the terminal 400 interacts during its processing with the method 300.

In an embodiment, the terminal 400 is one of: a POS terminal, a SST, an ATM, a kiosk, a tablet, and/or a laptop.

The terminal 400 includes a motherboard 401. The motherboard includes a processor 402, memory 403, and a sensor 404. The terminal 400 further includes a non-transitory computer-readable storage medium 405 having executable instructions representing a terminal agent 406.

The executable instructions when executed from the non-transitory computer-readable storage medium 405 cause the processor 402 to perform the processing of the terminal agent 406.

The terminal agent 406 is configured to: capture sensor event data provided by the sensor 404 when movement or acceleration of the terminal 400 is detected; correlate the sensor event data with transaction data associated with a transaction being processed on the terminal 400; and provide correlated sensor-event data to a predictive management system that proactively predicts a problem that is expected to occur on the terminal 400 but has not yet occurred.

In an embodiment, the predictive management system is the predictive management service 161 and/or the method 300.

In an embodiment, the terminal agent is all or some combination of the logger 132, the reporter 133, and/or the method 200.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

obtaining sensor event data comprising movement data or acceleration data from a sensor integrated into a motherboard of a transaction terminal;

correlating the sensor event data with transaction data being processed on the terminal and correlating the sensor event data with service data associated with the transaction terminal as sensor-transaction data;

providing the sensor-transaction data to a predictive management service to proactively predict a service action on the transaction terminal in advance of a terminal problem being experienced by the transaction terminal; and notifying a service management system that the transaction terminal requires the service action based on identification of the terminal problem by the predictive management service.

2. The method of claim 1, wherein obtaining further includes obtaining the sensor event data as the movement data and the acceleration data detected by the sensor for the transaction terminal during operation of the transaction terminal.

3. The method of claim 2, wherein obtaining further includes acquiring the sensor event data from a 3-axis sensor embedded in the motherboard of the transaction terminal as the sensor, and wherein the sensor includes a temperature/humidity sensor.

4. The method of claim 1, wherein correlating further includes associating the sensor event data with the transaction data based on time stamps associated with the sensor event data and the transaction data.

5. The method of claim 1, wherein correlating further includes including within the sensor-transaction data identifiers for the transaction terminal, a site associated with the transaction terminal, and an operator that is operating the transaction terminal.

6. The method of claim 1, wherein providing further includes providing the sensor-transaction data based on a preconfigured amount of sensor-transaction data being detected.

7. The method of claim 1, wherein providing further includes providing the sensor-transaction data based on a threshold measurement when compared to the sensor event data.

8. The method of claim 1, wherein providing further includes providing the sensor-transaction data based a preconfigured amount of elapsed time since previous sensor-transaction data was sent to the predictive management service.

9. The method of claim 1, wherein providing further includes providing the sensor-transaction data based on a dynamic request made by the predictive management service for the sensor-transaction data.

10. The method of claim 1 further comprising, receiving a warning message with respect to an impending terminal problem identified by the predictive management service and displaying the warning message on a display of the transaction terminal to an operator.

11. The method of claim 1 further comprising, proactively disabling a component of the transaction terminal based on an instruction received from the predictive management service.

12. A method, comprising:
receiving sensor-transaction data that includes movement data or acceleration data of a transaction terminal that was captured by a sensor embedded in a motherboard of the transaction terminal and a transaction manager that executes on the transaction terminal;

correlating the sensor-transaction data with service data associated with service records for the transaction terminal;
identifying by a predictive management service an impending problem for a component of the transaction terminal based on the correlating; and
notifying a service management system that the transaction terminal requires a service action based on the impending problem, the component, and the service records.

13. The method of claim 12, wherein receiving further includes obtaining the sensor-transaction data from the transaction terminal based on issuing a pull request for the sensor-transaction data to the transaction terminal.

14. The method of claim 12, wherein receiving further includes obtaining the sensor-transaction data from the transaction terminal at predefined intervals of time.

15. The method of claim 12, wherein correlating further includes providing the service-transaction data as input to a trained machine-learning algorithm, wherein the predictive management service comprises the trained machine-learning algorithm.

16. The method of claim 15, wherein identifying further includes receiving notification of the impending problem as output from the machine learning algorithm.

17. The method of claim 12, wherein identifying further includes matching a pattern in the service-transaction data with a known pattern associated with the impending problem.

18. The method of claim 12 further comprising, sending a warning message for the impending problem to the transaction terminal to display to an operator of the transaction terminal.

19. A transaction terminal, comprising:
a motherboard having a processor, memory and a sensor;
a non-transitory computer-readable storage medium having executable instructions;
the processor configured to load the executable instructions from the non-transitory computer-readable storage medium into the memory and execute the executable instructions, which cause the processor to:
capture sensor event data provided by the sensor when movement or acceleration of the transaction terminal is detected;
correlate the sensor event data with transaction data associated with a transaction being processed on the transaction terminal;
provide the correlated sensor-event data to a predictive management system that proactively predicts a problem that is expected to occur on the transaction terminal but has not yet occurred; and
notify a service management system that the transaction terminal requires a service action based on the problem.

20. The transaction terminal of claim 19, the transaction terminal is one of: a Point-Of-Sale (POS) terminal, a Self-Service Terminal (SST), an Automated Teller Machine (ATM), a kiosk, a tablet computer, or a laptop computer, and wherein the sensor is a 3-axis sensor.

* * * * *